United States Patent [19]

Roesky et al.

[11] 3,919,301

[45] Nov. 11, 1975

[54] PERFLUOROALKYL SULPHINIC ACIDS AND A PROCESS FOR THEIR PRODUCTION

[75] Inventors: Herbert Walter Roesky, Frankfurt am Main; Hans Niederprum, Monheim, Rhineland; Manfred Wechsberg, Opladen, all of Germany

[73] Assignee: Bayer Aktiengesellschaft, Leverkusen, Germany

[22] Filed: Sept. 20, 1972

[21] Appl. No.: 290,680

[30] Foreign Application Priority Data
Sept. 29, 1971 Germany............................ 2148597

[52] U.S. Cl. ........ 260/513.7; 260/556 H; 260/501.2
[51] Int. Cl.² ....................................... C07C 145/00
[58] Field of Search ................................. 260/513.7

[56] References Cited
UNITED STATES PATENTS 2,950,317   8/1960   Brown et al. .................... 260/408
3,420,877   1/1969   Pavlik ............................. 260/513.7
3,518,236   6/1970   Hunter ............................ 260/513.7

OTHER PUBLICATIONS

Burdon et al, J. Chem. Soc., pp. 2574–2578 (1957).

*Primary Examiner*—Bernard Helfin
*Assistant Examiner*—Nicky Chan
*Attorney, Agent, or Firm*—Burgess, Dinklage & Sprung

[57] ABSTRACT

Perfluoroalkyl sulfinic acids of the formula
$R_F SO_2 H$
wherein
$R_F$ is a perfluoroalkyl radical,
are produced by contacting the corresponding perfluoroalkyl sulfinic acid fluoride with hydrazine in water or an organic solvent at about 30° to 100°C to form the hydrazonium salt. Upon addition of acid the free perfluoroalkyl sulfinic acid is liberated and may be purified by distillation or crystallization. Those compounds wherein $R_F$ has from 2 to 12 carbon atoms are new.

6 Claims, No Drawings

PERFLUOROALKYL SULPHINIC ACIDS AND A PROCESS FOR THEIR PRODUCTION

This invention relates to hitherto unknown perfluoroalkyl sulfinic acids corresponding to the general formula:

$$R_F{'}SO_2H$$

in which
  $R_F{'}$ represents a linear or branched aliphatic or cycloaliphatic perfluorinated radical having from 2 to 12 carbon atoms, and to a generally applicable process for the production of perfluoroalkyl sulfinic acids.

Although metal salts of perfluoroalkyl sulfinic acids have already been repeatedly described, it has not as yet been possible to produce the free acids. Although it has already been speculated that trifluormethane sulfinic acids could probably be obtained by the hydrolysis of 1,4-dimethoxytetrakis-trifluoromethyl sulfonyl benzene (for example on the strength of the observation of an acid reaction of the product mixture and on the fact that it is readily oxidized by hypochlorite), the free acid has not been isolated (cf. J. Org. Chem. 31, 3671 (1966)).

However, it has been possible to obtain poor yields of, for example, the zinc and sodium salts of trifluoromethane sulfinic acid in hydrated form by reduction of $CF_3SO_2Cl$ with zinc dust (cf. R.N. Haszeldine and J.M. Kidd, J. Chem. Soc. 1955, 2901). The reduction of perfluoroalkyl sulfonyl fluorides with sulfites at an elevated temperature has also been described (U.S. Pat. No. 3,420,877). Sodium borohydride has already been used as a reducing agent; the corresponding sulfinates were isolated, for example in the form of s-benzyl thiuronium salts, after very long reduction times (cf. J. Burdon et al, J. Chem. Soc. 1957, 2574). Finally, a few esters and amides and the chloride of trifluoromethane sulfinic acid $CF_3SOR$ have been obtained (Inorg. Chem. 10, (2) 1971; Inorg. Nucl. Chem. Letters, Suppl. to Inorg. Nucl. Chem. 6 (1970) 5, 501 – 506) while U.S. Pat. No. 2,950,317 discloses a process for the production of perfluoroalkyl sulfonyl chlorides by reacting perfluroalkyl sulfonyl fluorides with anhydrous hydrazine at low temperatures, followed by chlorination of the perfluoroalkane sulfonic acid hydrazides formed as intermediates. This reaction proceeds in accordance with the following equation:

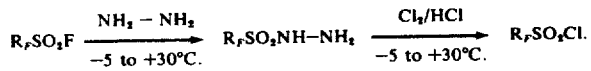

Accordingly, this reaction is not accompanied by reduction of the sulfofluoride to the sulfinate (cf. D. Osterroth, Chemie und Technologie aliphatischer fluororganischer Verbindungen (Chemistry and Technology of Aliphatic fluoroorganic Compounds), 1964, page 183); instead, the reaction mixture of hydrazide and hydrazonium fluoride is directly chlorinated in a basically uneconomical manner. This results in a very high consumption of chlorine and in destruction of the hydrazine derivatives; furthermore there is a danger of explosive chlorine-nitrogen compounds being formed while the HF liberated can cause corrosion of the apparatus used.

It is accordingly an object of the invention to provide a simple process for producing perfluoroalkyl sulfinic acids in high yields.

These and other objects and advantages are realized in accordance with the present invention pursuant to which there is provided a process for the production of a perfluoroalkyl sulfinic acid corresponding to the general formula:

$$R_FSO_2H$$

in which
  $R_F$ represents a linear or branched aliphatic or cycloaliphatic perfluorinated radical having from 1 to 12 carbon atoms, wherein a perfluoroalkyl sulfonyl fluoride $R_FSO_2F$ is contacted with hydrazine at a temperature above about 30°C in the presence of a solvent to form the corresponding hydrazonium salt and the resulting perfluoroalkyl sulfinic acid is liberated from the hydrazonium salt by the addition of an acid.

Reaction of the perfluoroalkyl sulfonyl fluorides with the hydrazine component is carried out in a suitable solvent at temperatures above about 30° c, after which the free acid is isolated from the hydrazonium salt by acidification with strong acids and can then be purified by distillation or crystallization. This very fast and substantially quantitative reaction takes place in accordance with the following equation:

$$R_FSO_2F + 2 NH_2-NH_2 \rightarrow R_FSO_2H \cdot N_2H_4 + \frac{1}{2} N_2 + \frac{1}{2} N_2H_4 \cdot 2 HF.$$

Surprisingly, non-fluorinated aliphatic sulfinic acids cannot be obtained by this same reaction.

In its most general form, the process according to the invention is carried out by reacting the perfluoroalkyl sulfonyl fluoride with the hydrazine component at a temperature in the range of from about 30° to 100° C in the presence of water and/or of an organic solvent. On completion of the reaction, whose progress can readily be followed by measuring the quantity of the nitrogen liberated, the sulfinic acid, in the form of its hydrazonium salt, can be isolated in different ways:

a. after the hydrazonium fluoride has been filtered off and the solvent distilled off, the free sulfinic acid is liberated with sulfuric acid, preferably concentrated sulfuric acid, and worked up by distillation.

b. the reaction mixture is treated with aqueous HCl or gaseous hydrogen chloride. The resulting solution is then worked up by distillation.

c. gaseous HCl is introduced into the mixture of the salts in an organic solvent, the hydrohalides formed are separated off, concentrated by evaporation and the sulfinic acid purified by distillation or, in the case of longer-chain derivatives, preferably by crystallization. The hydrazine may optionally be recovered from the hydrazine hydrohalides filtered off so that only 0.5 moles of $N_2H_4$ are required for converting 1 mole of sulfonyl fluoride into the corresponding sulfinic acid.

Instead of sulfuric acid or hydrochloric acid, it is also possible to use any other strong acid such as, for example an acid of phosphorus.

The perfluoroalkyl sulfonyl fluorides corresponding to the required end products are used as the starting substances. They can readily be obtained for example by the electrochemical fluorination of sulfonyl derivatives in ahydrous hydrofluoric acid. For example, it is possible to use the perfluoroalkyl sulfonyl fluorides $CF_3SO_2F$, $C_2F_5SO_2F$, $C_4F_9SO_2F$, $C_8F_{17}SO_2F$ or $C_6F_{11}SO_2F$.

Anhydrous hydrazine, hydrazine hydrate and even aqueous hydrazine solutions can be used as the hydrazine component. The quantity in which the hydrazine is used should be substantially stoichiometric in relation to the quantity of the fluoride, in other words the quantitative ratios should amount to substantially 2:1, although it is quite possible to use a stoichiometric deficit or excess, e.g. preferably up to about 3:1 molar ratio.

Suitable solvents include particularly ethers, for example diethyl ether, tetrahydrofuran, dioxane or mixed ethers. It is also possible to use alcohols such as methanol, ethanol, or even higher alcohols and chlorinated hydrocarbons, for example $CH_2Cl_2$.

The perfluoroalkyl sulfinic acids are highly reactive compounds which are not only of interest as novel organic acids, but are also eminently suitable as intermediate products for further reactions.

The perfluoroalkyl sulfinic acids may be used as activators for the polymerization in redox system (polymerization of unsaturated systems), in particular for the polymerization of olefins and acrylonitrile, whereby the long-chain compounds show the desired emulsifying effect, e.g. in polymerizing acrylonitrilemethyl acrylate using sodium persulfate-sodium sulfite as catalyst and perfluorooctyl sulfinic acid as activator. The salts of these acids, the perfluoroalkyl sulfinates as well as the addition compounds of these sulfinic acids and unsaturated compounds, e.g. maleic acid anhydride or ethylene oxide, may be used as hydrophobic and oleophobic agents for textiles and leather as well as impregnating agents for paper to render them water or oil repellent.

Further, chlorination gives substantially quantitative yields of the corresponding perfluoroalkyl sulfonyl chlorides which are far more reactive than the sulfonyl fluorides and can be used for the production of valuable derivatives for use as wetting agents and surfactants, and as impregnating agents for textiles, leather and paper.

The invention is illustrated by the following Examples:

EXAMPLE 1

Trifluoromethyl sulfinic acid 2 mols (304 g) of gaseous $CF_3SO_2F$ were slowly introduced at reflux temperature into a vigorously stirred suspension of 5.25 mols (262.5 g) of hydrazine hydrate in 500 ml of diethyl ether, nitrogen being continuously formed. Thereafter, the ether was distilled off, the viscous residue was introduced into concentrated $H_2SO_4$ and distilled. $CF_3SO_2H$ boils at $b.p._1$ 39° and was identified by IR—, H— and 19F—nuclear resonance spectra. Analysis was carried out titrimetrically (alkalimetry, oxidimetry). The yield was 74% of the theoretical. For chemical identification, elemental chlorine was introduced into 0.15 mole (20 g) of $CF_3SO_2H$ at room temperature until the colorness solution turned yellow in color. The $CF_3SO_2Cl$ formed was distilled at b.p. = 32° C and physico-chemically identified. The yield was 92% of the theoretical.

EXAMPLE 2

Perfluorobutylsulfinic acid 0.5 mole (151 g) of perfluorobutyl sulfonyl fluoride was added dropwise to a solution of 1.1 mole (55 g) of hydrazine hydrate in 300 ml of ethanol. The reaction mixture was spontaneously heated, the reaction temperature did not exceed 60° C., gas evolution began at as low as 30° C. and, on completion of the reaction, corresponded to the theoretically expected volume of 6.0 liters of nitrogen (measured at substantially 20°C.). At any given moment during the reaction, the particular quantity of gas measured corresponded to the volume of nitrogen expected from the quantity of $C_4F_9SO_2F$ added dropwise.

After cooling, hydrogen chloride was introduced in excess while cooling with water, the hydrazonium salts precipitated were filtered off and the filtrate concentrated in vacuo. A colorless liquid distilled at $b.p._1 = 64°C$. Yield 78% of the theoretical.

The perfluorobutyl sulfinic acid was identified through its IR, $^1$HNMR and $^{19}$FNMR spectrum and was examined titrimetically (alkalaimetry, oxidimetry) and by elementary analysis.

For chemical identification, chlorine was introduced into a solution of 0.1 mole (18.4 g) of perfluorobutyl sulfinic acid in 60 g of glacial acetic acid at 20° C. until the solution turned yellow in color. The perfluorobutyl sulfonyl chloride formed was purified by washing the reaction mixture with ice water and, according to a gas chromatogram, was already 95% pure. Yield: 93% of the theoretical (after distillation at b.p. 101° C.).

EXAMPLE 3

Perfluorooctyl sulfinic acid 27.5 g of hydrazine hydrate (0.55 mole) were added dropwise with stirring over a period of 30 minutes to a solution of 125.5 g of perfluorooctyl sulfonyl fluoride (0.25 mole) in 500 ml of diethyl ether. The reaction mixture underwent spontaneous heating. By heating the reaction mixture for about another hour until it boiled under reflux, it was possible to liberate 2.9 liters of nitrogen (theoretical 2.8 liters). Thereafter HCl gas was introduced at a temperature of from 0° to 20° C. until no more salt was precipitated. After filtration and washing with ether, the clear yellow solution was concentrated in a water jet vacuum and then in an oil pump vacuum at 0.3 Torr/40° C. A pale yellow salt-like product was left as the residue. Yield 93.9 g (approximately 80% of the theoretical).

The IR— and NMR—spectra are consistent with the structure indicated.

For chemical identification of the substance obtained, 20 g of chlorine were introduced over a period of 15 minutes at a temperature of from 20° to 30° C. into a suspension of 91 g of the substance in 300 ml of carbon tetrachloride. The previously insoluble salt entered almost completely into solution during the introduction of chlorine. The yellow solution which is completely clear after filtration is concentrated in a water jet pump vacuum and distilled. The perfluorooctyl sulfonyl chloride obtained boils at $b.p._{10} = 75°$ to 76° C. The yield was approximately 88% of the theoretical.

EXAMPLE 4 (Application)

A mixture consisting of 48 parts (by weight) perfluorooctane sulfinic acid, 11 parts of acrylic acid, 0.5 parts of powdered copper and 60 parts of acetone was stirred at a temperature between 50° and 60°C for 2 hours.

After stripping the solvent 56 parts of dark brown colored crystals were obtained which were recrystallized from benzene/acetone (m.p. 180°–]183°C) Elemental analysis and IR-spectra data are consistent with the following structure $C_8F_{17}SO_2CH_2CH_2COOH.$ The sulfinic acid served to introduce the perfluorooctyl group which imparts surfactant and olephobic properties to the above mentioned compound.

It will be appreciated that the instant specification and examples are set forth by way of illustration and not limitation, and that various modifications and changes may be made without departing from the spirit and scope of the present invention.

What is claimed is:

1. A process for the production of a perfluoroalkyl sulfinic acid of the formula $R_FSO_2H$, wherein $R_F$ is a perfluorinated alkyl or cycloalkyl radical containing up to 12 carbon atoms, which comprises contacting a perfluoroalkyl sulfonyl fluoride of the formula $R_FSO_2F$ with hydrazine at a temperature near or at reflux in the presence of a solvent selected from the group consisting of water, diethyl ether, tetrahydrofuran, dioxane, alkanols and chlorinated hydrocarbons to form the hydrazonium salt of the corresponding sulfinic acid and acidifying with a strong acid whereby there is formed the corresponding perfluoroalkyl sulfinic acid.

2. A process as claimed in claim 1, wherein the hydrazine is used in anhydrous form, in hydrate form or in aqueous solution.

3. A process as claimed in claim 1, wherein the hydrazine is used in about 2 to 3 times the molar amount of the perfluoroalkane sulfonyl fluoride.

4. A process as claimed in claim 1, wherein the perfluoroalkyl sulfinic acid is liberated from its hydrazonium salt by addition of hydrogen chloride, hydrochloric acid, an acid of phosphorus or sulfuric acid, and the perfluoroalkyl sulfinic acid is thereafter purified by vacuum distillation or crystallization.

5. A process as claimed in claim 4, wherein the hydrazine is used in anhydrous form, in hydrate form or in aqueous solution in about 2 to 3 times the molar amount of the perfluoroalkane sulfonyl fluoride.

6. A process as claimed in claim 1, wherein $R_F'$ is a perfluorinated straight chain alkyl radical.

* * * * *